United States Patent [19]
Slawsky et al.

[11] 3,893,061
[45] July 1, 1975

[54] UNDERWATER ACOUSTIC DETECTION SYSTEM

[75] Inventors: Zaka I. Slawsky, Bethesda; Wayne Dee Wilson, Silver Springs, both of Md.

[73] Assignee: The United States of America as represented by the Secretary of the Navy, Washington, D.C.

[22] Filed: May 13, 1970

[21] Appl. No.: 48,620

[52] U.S. Cl. .................. 340/3 E; 340/6 R
[51] Int. Cl.² ........................... H04B 11/00
[58] Field of Search ........ 340/2, 3 R, 3 E, 5 R, 6 R; 343/5 PD

[56] References Cited
UNITED STATES PATENTS
3,171,094  2/1965  Geren et al. ............... 340/3 E
3,316,529  4/1967  O'Donnell et al. ............... 340/2

OTHER PUBLICATIONS
Wasik, "Electronics", Vol. 36, No. 7, Feb. 15, 1963, pg. 18.

*Primary Examiner*—Richard A. Farley
*Attorney, Agent, or Firm*—R. S. Sciascia; J. A. Cooke

[57] ABSTRACT

An underwater acoustic detection system having remotely located passive detection field units submerged underwater and a centrally located receiving station having an underwater receiver. The field units passively detect the presence of surface or submerged objects by the objects' acoustic noise and transmit an acoustic detection signal in response thereto. The transmitted acoustic detection signal is detected by the receiving station's underwater receiver and converted into a utilizable form in the receiving station.

4 Claims, 4 Drawing Figures

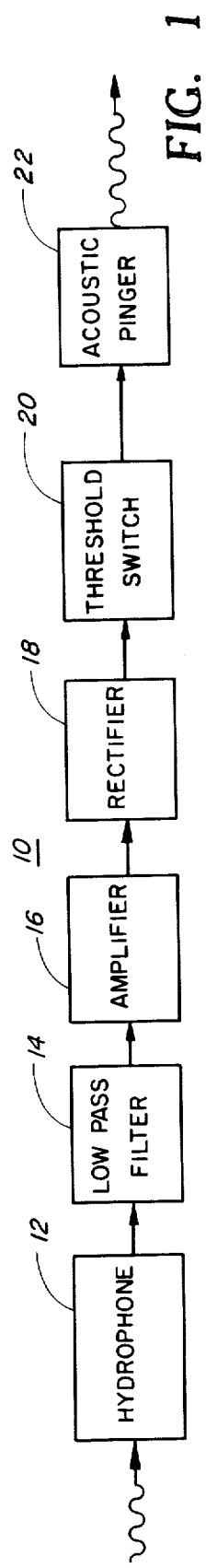
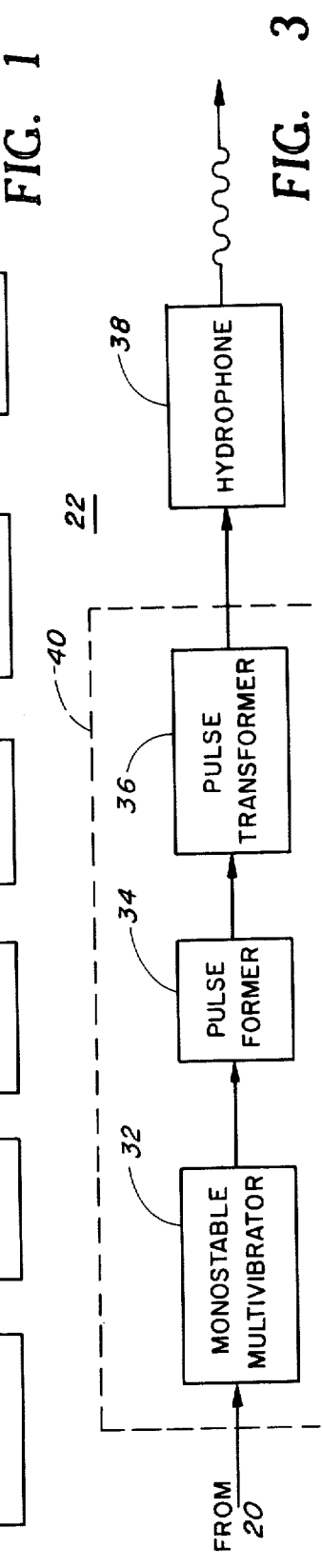
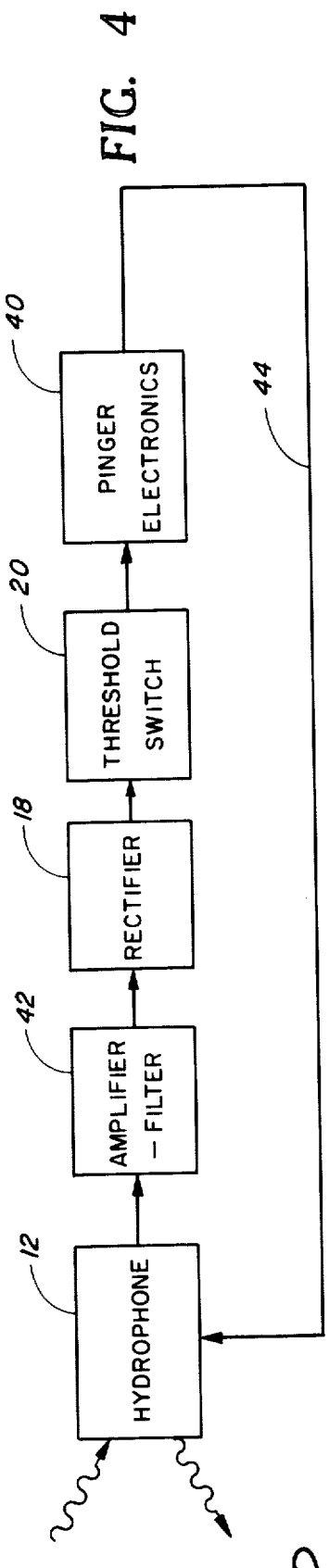
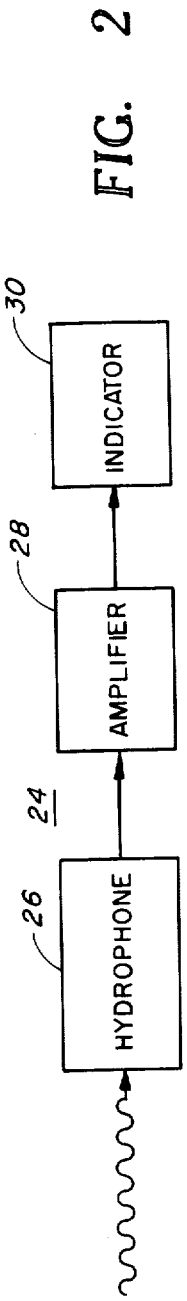

1

UNDERWATER ACOUSTIC DETECTION SYSTEM

BACKGROUND OF THE INVENTION

This invention relates generally to underwater detection systems, and more particularly to an underwater passive acoustic detection system.

Two types of underwater passive acoustic systems are presently in use. In one system, a hydrophone is deployed underwater and connected to a receiving station by means of a long electrical cable. When a marine vessel comes within the detection range of the hydrophone, an electrical signal is transmitted over the cable to the receiving station. Although operable, this system suffers from a number of inherent limitations. First, the range between the hydrophone and the receiving station is limited to the length of the cable. Second, handling difficulties arise with the long lengths of cable when deploying or retrieving the hydrophone. Finally, the cable is susceptible to breaks which incapacitate the system.

The second type of present day system uses what is commonly referred to as a sonobuoy device. In this system, a passive listening hydrophone is attached by a short cable to a buoy floating on the surface of the water. The buoy contains a radio transmitter that transmits the signals received from the hydrophone to a monitoring station, such as a hovering airplane. This system, although operational, also suffers from a number of disadvantages. First, its useful range is limited by the capabilities of the radio transmitter. Second, the sonobuoy cannot be concealed because the buoy must float on the surface of the water, thereby increasing the susceptability to detection and destruction. Third, the detection depth of the system is limited because the transmitter must remain on the surface. Fourth, in some locations, particularly in rivers and lakes, the sonobuoy transmission may interfere with other communication systems in the area.

Finally, in some situations it may be undesirable to transmit a signal that can be picked up by ordinary radio receivers or by an enemy.

SUMMARY OF THE INVENTION

Accordingly, one object of this invention is to provide a new and improved underwater system for detecting surface and submerged objects.

Another object of the invention is the provision of an underwater acoustic detection system capable of detecting the presence of surface and sub-surface objects and of transmitting a notice of any such detection over long distances to a control center.

Still another object of the instant invention is to provide an underwater acoustic detection system that cannot be easily detected and destroyed.

A further object of this invention is the provision of an underwater acoustic detection system that can be operated without interfering with other communication systems.

A still further object of the instant invention is to provide an underwater acoustic detection system for transmitting detection information over long ranges that cannot be picked up by ordinary radio receivers.

Briefly, these and other objects of this invention are attained by providing an underwater acoustic detection system having at least one submerged and self-contained remote field unit passively detecting underwater acoustic noise from surface and submerged objects and transmitting an acoustic detection signal underwater to a receiving station where it is transformed into a utilizable form to respond to the presence of an object.

BRIEF DESCRIPTION OF THE DRAWING

FIG. 1 is a block diagrammatic view of one embodiment of the field detection unit employed in the present invention;

FIG. 2 is a block diagrammatic view of the receiving station unit employed in the present invention;

FIG. 3 is a block diagrammatic view of the acoustic pinger used in the field detection unit; and FIG. 4 is a block diagrammatic view of an alternative embodiment of the field detection unit of the instant invention.

DESCRIPTION OF THE PREFERRED EMBODIMENTS

Referring now to the drawings wherein like reference characters designate identical or corresponding parts throughout the several views, and more particularly to FIG. 1 thereof wherein the system is shown as including a remote detection field unit 10, whose operating environment is a body of water, such as a harbor entrance, lake or river where it is deployed for detecting the presence of surface or submerged objects, such as boats, ships, submarines, torpedoes or underwater swimmers. To avoid detection and possible destruction, the unit is normally submerged in the water by mooring to the bottom. When there is little or no threat of destruction to the unit, it may be attached to a buoy for later retrieval.

The detection unit 10 is powered by a portable source of energy, such as a battery, not shown, and adapted for underwater use by any conventional method of effecting watertightness.

The system includes a conventional hydrophone 12, such as that used on sonobuoys, which detects the ambient acoustic noise always present in the water in the absence of a moving object which typically covers a broad band of frequencies. The hydrophone converts the detected acoustic noise into an electrical noise signal which, in turn, is applied to a lowpass filter 14 such as a conventional RC passive or active filter, wherein it is filtered, and the noise frequencies outside of the filter bandwidth greatly attenuated. The filtered signal may then be fed to an amplifier 16, such as an operational amplifier, wherein it is amplified to a level sufficient for further signal processing. The resulting bandlimited a.c. background noise signal is applied to a rectifier 18, such as a conventional full wave diode rectifier, for rectification and produces an equivalent d.c. background noise level. The equivalent d.c. background noise signal is fed to a threshold switch 20, such as a Schmitt trigger or electromechanical relay, which is adjusted so that the normal d.c. level of the ambient background acoustic noise signal is insufficient to close the switch. Consequently, the acoustic pinger 22, to be more fully described hereinafter which is actuated by the closure of switch 20, will be prevented from generating and transmitting an underwater acoustic signal.

When a ship or other object moves within the detection range of hydrophone 12, it produces an acoustic noise additional to that of the ambient background noise that is detected by hydrophone 12 and converted into an electrical a.c. signal and processed by lowpass filter 14, amplifier 16, and rectifier 18 in the same manner as hereinbefore described with reference to the ambient background noise signal. However, the increased d.c. level caused by the presence of the noise generating object is sufficient to operate the threshold sensitive switch 20, whereupon acoustic pinger 22 is actuated to generate and transmit an acoustic pulse through the water.

To ensure that the acoustic pulse from pinger 22 is not fed back through the system in a regenerative manner, the transmitted pulse frequency is designed to be substantially above the cutoff frequency of the lowpass filter 14. Thus, although the transmitted pulse may be received by hydrophone 12, it does not pass through filter 14.

The acoustic pulse from acoustic pinger 22 is transmitted through the water to a distantly located control or receiving station unit 24, shown in FIG. 2. This unit includes an omnidirectional hydrophone 26, which may be the same kind as hydrophone 12, that is submerged or buoyed in the same body of water as the field detection unit 10, and intercepts the transmitted acoustic pulse and converts it into an electrical signal. The electrical signal may then be fed to and amplified by an amplifier 28, such as an operational amplifier, and then converted into an intelligible form by an indicator 30, such as a conventional alarm, cathode ray oscilloscope, or graphic recorder. Alternatively, the electrical signal may be used to actuate a mine located near the remote field unit to thereby destroy the detected object.

One type of acoustic pinger that may be employed with the present invention is shown in FIG. 3, comprising pinger electronics shown within dotted line 40, and a hydrophone 38. The electronics includes a monostable multivibrator 32, such as a conventional two-transistor monostable multivibrator, which is triggered when threshold switch 20 is closed, thereby producing a rectangular wave of a limited duration. This wave is applied to and triggers a pulse former 34, such as a differentiating circuit, into producing a high amplitude, short duration pulse. The high amplitude, short duration pulse is fed to a pulse transformer 36 which impedance matches this pulse with hydrophone 38. In response thereto, hydrophone 38 transmits an acoustic pulse into the surrounding liquid medium.

An alternative embodiment of the field detection unit 10 is shown in FIG. 4 wherein the acoustic pinger hydrophone 38 is replaced by the receiving hydrophone 12, and the lowpass filter 14 and amplifier 16 of FIG. 1 are combined in an amplifier-filter 42. In this embodiment hydrophone 12 can be used for both receiving the acoustic input signals and transmitting the acoustic pinger signal which is coupled thereto through feedback connection 44. By this arrangement one hydrophone in the field unit is eliminated and the amplifying and filtering functions are combined into a single elemental circuit, such as an operational amplifier filter.

In the acoustic detection system of the present invention it is envisioned that numerous field units may be deployed to form a detection network, whereas only a few or perhaps one centrally located receiving station unit will be employed. In such a system, the acoustic signal generated and transmitted by each unit may be at a different frequency from the other units thereby enabling the identification at the control unit of the specific field unit from which the acoustic signal originated.

It will be apparent that numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An underwater acoustic detection system comprising:

hydrophone means for detecting an acoustic signal from an object in the water medium and converting said acoustic signal into an electrical signal;

low pass filter means for filtering said electrical output signal to provide a bandwidth limited electrical signal;

a full wave rectifier for providing a rectified electrical signal from said bandwidth limited electrical signal;

a threshold switch sensitive to the level of said rectified electrical signal that closes when the amplitude of said rectified electrical signal is above a certain threshold level;

an acoustic pinger for transmitting an acoustic detection signal through the water medium in response to the closing of said threshold switch, said acoustic detection signal having a frequency substantially higher than the cutoff frequency of said low pass filter; and means remotely located from said hydrophone for receiving said transmitted signal.

2. An underwater acoustic detection system as recited in claim 1, wherein said certain threshold level represents the ambient background noise in said water medium.

3. An underwater acoustic detection system as recited in claim 2, wherein said remotely located means comprises:

means for receiving said transmitted acoustic detection signal; and means for converting said transmitted acoustic detection signal into a utilizable form.

4. An underwater acoustic detection system as recited in claim 3 wherein said detecting and transmitting means are separately located.

* * * * *